Oct. 2, 1962 E. C. RAY 3,056,227
FISHING DEVICE, PARTICULARLY FOR ICE FISHING
Filed Nov. 16, 1961
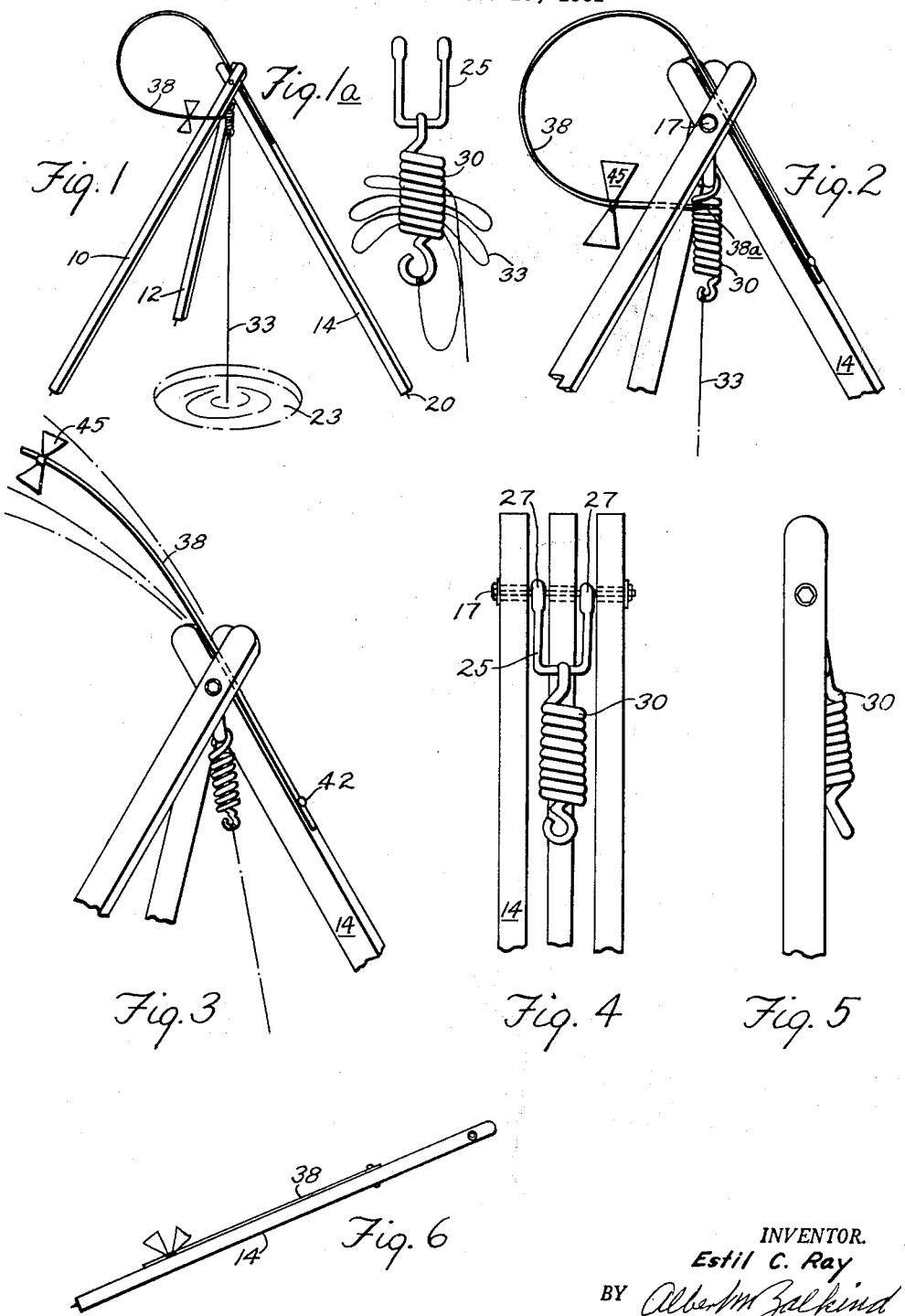
INVENTOR.
Estil C. Ray

United States Patent Office 3,056,227
Patented Oct. 2, 1962

3,056,227
FISHING DEVICE, PARTICULARLY FOR
ICE FISHING
Estil C. Ray, 23812 Farmington Road, Farmington, Mich.
Filed Nov. 16, 1961, Ser. No. 152,820
6 Claims. (Cl. 43—17)

This invention relates to a fishing device and more particularly to a tripod structure of the kind used to suspend a fishing line over a hole cut in ice.

The prior art is well developed in various rigs and arrangements for so-called ice fishing. However, there are certain disadvantages in such prior art devices. For example, the strong tug of a fish on the line has been known to break the line. Another disadvantage is the difficulty of having a completely reliable signal or indicator which gives warning that a fish has struck the hook. A further disadvantage is the disorderly array of slack in the line where the line is of considerably greater length than the depth of water being fished.

The present invention has for its object to overcome the above disadvantages, all in a compact, simple, sturdy economical device which can be readily folded for storage and quickly set up for use.

Briefly, the invention contemplates a tripod arrangement of legs having a common pivot pin, all of conventional construction, so that the legs may be folded in planar array for storage or spread out to be set over a hole cut in ice in the usual manner. The pivot pin carries a wire bracket from which is suspended a tension spring of suitable strength, the lower end of this spring having a fish line suspended therefrom; thus, a heavy tug on the line will extend the spring, which acts as a shock absorber to prevent breakage of the line. The manner of combination of the spring with the remaining structure is believed to be novel. Thus, by using a closed coil spring, any portion of slack in the line may be zig-zagged back and forth through the coils of the spring, leaving loops on each side, for purpose of keeping such slack, which may be considerable, from being snagged or fouled. An even more important purpose of using a closed coil spring is the fact that it can be used as a latch for a leaf spring end, which leaf spring, carried on one of the legs, can be bowed or cocked and the free end tucked in between a pair of coils of the spring. Thus, when a fish strikes and extends the tension spring, the tucked-in end of the leaf spring is released and the leaf spring whips up to a relatively upright position to apprise the fisherman that a fish is on the line. The construction is such that the leaf spring can be compactly folded with the remainder of the structure without being in bowed or cocked condition to do so.

A detailed description of the invention will now be given in conjunction with the appended drawing, in which:

FIG. 1 is a perspective of the invention shown set up over a hole cut in ice;

FIG. 1a is a fragmentary detail showing the manner of taking up slack on the line;

FIG. 2 is a fragmentary magnified view, in perspective, of the upper end of the rig showing the indicator means in cocked condition;

FIG. 3 is a view similar to FIG. 2 showing the indicator means at the moment of release;

FIG. 4 is an elevation of the upper portion of the device in folded condition;

FIG. 5 is a side view of the device in folded condition; and

FIG. 6 is a side view of the leg which holds the indicator device, showing the folded position of such device when not in use.

Referring now to the drawing, the invention comprises an arrangement of three legs, 10 12 and 14, joined at their upper portions by a pin or bolt 17 which passes loosely through suitably enlarged bores in the respective legs so that the legs can be swung out into conical array to effect the structure shown in FIG. 1 and yet rotated with respect to each other so as to be coplanar, for example, as seen on FIGS. 4 and 5, for storage.

The bottom of each leg carries a pin or spike 20 for digging into the ice surrounding the hole 23 cut therein.

Referring to FIG. 4, pin 17 carries a wire U-shaped bracket 25 having a pair of eyes such as 27, through which bolt 17 passes for suspension of the U-shaped bracket. The bottom portion of the bracket has hooked thereto a closed coil tension spring 30. As shown in FIG. 2, the lower eye of the tension spring secures a fish line 33 which may be tied thereto. It is pointed out at this time, however, that where the fish line has considerable slack, it may be looped back and forth between the coils of the spring, as indicated in FIG. 1a. The spring 30 is of readily yieldable resiliency so that the tug of a fish thereon will extend it to absorb the shock on the line, but of sufficient strength to normally remain in closed coil condition, or substantially closed coil condition for line storage, as shown in FIG. 1a, or for a more important purpose now to be described.

The leg 14 carries a resilient elongated leaf spring 38 by means of a securing element such as a rivet 42 which passes through the leg. The leaf spring 38 may be rotated to the position shown, for example in FIG. 2, extending outwardly of leg 14, for use, or into alignment with leg 14, as shown in FIG. 6, for storage.

Referring to FIGS. 2 and 3, it will be noted that the spring, carrying a flag such as 45, has been bowed from its initial, normally unstressed position (FIG. 3) to a cocked position (FIG. 2), the end 38a of the leaf spring being tucked in between a pair of coils of spring 30. Thus, member 38 is under bending stress and it will be appreciated that if spring 30 is extended to a predetermined degree by the tug of a fish on line 33, leaf spring end 38a will be released and the leaf spring will whip to a relatively upright, or its initial unstressed condition, as illustrated in FIG. 3. Obviously, due to mass and resiliency at the time of release, the leaf spring whips back and forth, as indicated, thus providing a moving signal for a few moments. If desired, the spring 38 may carry a small jingle bell (not shown).

Accordingly, it will be apparent that the spring 30 performs a number of functions, namely, to prevent line breakage, to serve as storage for line slack, and to serve as a latch when the signal leaf spring 38 has been bowed from an initial condition to a cocked condition.

The positioning of the signal element 38 on the center leg 14 aligns it in the plane of the spring 30 so as to render convenience in bowing and latching.

Having thus described my invention, I am aware that various changes may be made without departing from the spirit thereof and, therefore, do not seek to be limited to the precise illustrations herein given, except as set forth in the appended claims.

What I claim is:

1. In a fishing device, a foldable leg structure comprising a plurality of legs having a common pivot member at corresponding ends, said legs being pivotal to a straddling self-supporting position, a coil spring supported by said pivot member and depending therefrom when said leg structure is set up, a fish line secured to said coil spring, and a signal means carried by one of said legs and comprising an elongated resilient element bendable into a loop and having an end of sufficient thinness to be tucked between a pair of adjacent coils of said spring to be held fast thereby until said spring is extended for release of said end and having the other end thereof secured to said leg structure, said spring being of suitable resiliency as to be extended by the tug of a fish on said line and said spring serving to provide a resilient buffer effect so as to preclude breakage of said line by a violent tug thereon.

2. In a fishing device, a foldable leg structure comprising a plurality of legs having a common pivot member at corresponding ends, said legs being pivotal to a straddling self-supporting position, a coil spring supported by said pivot member and depending therefrom when said leg structure is set up, a fish line secured to said coil spring, and a signal means comprising an elongated resilient element bendable into a loop and having an end of sufficient thinness to be tucked between a pair of adjacent coils of said spring to be held fast thereby until said spring is extended for relase of said end, said spring being of suitable resiliency as to be extended by the tug of a fish on said line and said spring serving to provide a resilient buffer effect so as to preclude breakage of said line by a violent tug thereon, said resilient elongated element being secured at an end thereof to one of said legs and being pivotal with respect thereto and bendable over the top thereof.

3. In a fishing device, a foldable leg structure comprising a plurality of legs having a common pivot member at corresponding ends, said legs being pivotal to a straddling self-supporting position, a coil spring supported by said pivot member and depending therefrom when said leg structure is set up, a fish line secured to said coil spring, and a signal means comprising an elongated resilient element bendable into a loop and having an end of sufficient thinness to be tucked between a pair of adjacent coils of said spring to be held fast thereby until said spring is extended for release of said end, said spring being of suitable resiliency as to be extended by the tug of a fish on said line and said spring serving to provide a resilient buffer effect so as to preclude breakage of said line by a violent tug thereon, said common pivot member comprising a pin passing through said legs, a U-shaped bracket carried by said pin and having side portions disposed between said legs, an end of said spring being attached to said bracket.

4. In a fishing device, a foldable leg structure comprising a plurality of legs having a common pivot member at corresponding ends, said legs being pivotal to a straddling self-supporting position, a coil spring supported by said pivot member and depending therefrom when said leg structure is set up, a fish line secured to said coil spring, and a signal means comprising an elongated resilient element bendable into a loop and having an end of sufficient thinness to be tucked between a pair of adjacent coils of said spring to be held fast thereby until said spring is extended for release of said end, said spring being of suitable resiliency as to be extended by the tug of a fish on said line and said spring serving to provide a resilient buffer effect so as to preclude breakage of said line by a violent tug thereon, said resilient elongated element having an end secured to one of said legs and being pivotal with respect thereto and bendable over the top thereof, said common pivot member comprising a pin passing through said legs, a U-shaped bracket carried by said pin and having side portions disposed between said legs, an end of said spring being attached to said bracket.

5. In a device as set forth in claim 1, at least one loop of said line being wedged between coils of said spring to take up slack.

6. An ice fishing device comprising a support means, attachment means comprising a resiliently stretchable element, a fishing line attached to said element and said element being secured to said support means whereby the tug of a fish on said line is operative to stretch said element, a signal member comprising an elongated flexibly bendable member, means for securing one end of said member, said member being bendable from a normal position to a cocked position, said member having another end latchable in said cocked position by said stretchable element when said stretchable element is in relatively contracted condition so that stretching of said element by a pull on said line serves to release said signal member for the resumption of normal position to indicate that a fish has been caught on said line.

References Cited in the file of this patent

UNITED STATES PATENTS

| | | |
|---|---|---|
| 1,250,053 | Tukey | Dec. 11, 1917 |
| 1,264,000 | Bernhardt | Apr. 23, 1918 |
| 2,977,704 | Tinsley | Apr. 4, 1961 |